United States Patent
Olmscheid et al.

(10) Patent No.: US 9,000,114 B2
(45) Date of Patent: Apr. 7, 2015

(54) PROCESS AND APPARATUS FOR MIXING AND SPLITTING FLUID STREAMS

(75) Inventors: Michael Olmscheid, Odenthal (DE); Manfred Hecker, Neustadt Wied (DE); Rainer Karer, Kaiserslautern (DE); Paulus-Petrus Maria De Lange, Wesseling (DE)

(73) Assignee: Basell Polyolefine GmbH, Wesseling (DE)

( * ) Notice: Subject to any disclaimer, the term of this patent is extended or adjusted under 35 U.S.C. 154(b) by 2 days.

(21) Appl. No.: 13/813,604

(22) PCT Filed: Aug. 2, 2011

(86) PCT No.: PCT/EP2011/063266
§ 371 (c)(1),
(2), (4) Date: Jan. 31, 2013

(87) PCT Pub. No.: WO2012/016971
PCT Pub. Date: Feb. 9, 2012

(65) Prior Publication Data
US 2013/0131300 A1 May 23, 2013

Related U.S. Application Data

(60) Provisional application No. 61/401,815, filed on Aug. 19, 2010.

(30) Foreign Application Priority Data

Aug. 2, 2010 (EP) .................................... 10008047

(51) Int. Cl.
| B29B 7/00 | (2006.01) |
| B01F 3/08 | (2006.01) |
| B01F 15/00 | (2006.01) |
| B01J 4/00 | (2006.01) |
| C08F 10/00 | (2006.01) |
| C08F 110/02 | (2006.01) |

(52) U.S. Cl.
CPC .............. B29B 7/007 (2013.01); B01F 3/0803 (2013.01); B01F 15/00162 (2013.01);
(Continued)

(58) Field of Classification Search
CPC ............ C08F 2/00; C08F 2/34; B01F 5/0646; B01F 3/0861; B01F 5/0654; B01F 3/0865; B01F 15/00207; B01F 15/00253; B01F 15/00285
USPC .............. 526/348; 366/151.1, 152.1; 422/131
See application file for complete search history.

(56) References Cited

U.S. PATENT DOCUMENTS 7,059,363 B2   6/2006  Sugiyama et al.
7,150,994 B2 * 12/2006  Bergh et al. ..................... 436/37
(Continued)

FOREIGN PATENT DOCUMENTS

CN    1543596 A    11/2004
CN    1809794 A    7/2006
(Continued)

OTHER PUBLICATIONS

PCT International Search Report & Written Opinion mailed Nov. 7, 2011, for PCT/EP2011/063266.

*Primary Examiner* — Ling Choi
*Assistant Examiner* — Catherine S Branch

(57) ABSTRACT

A process for continuously mixing at least two fluid streams and splitting the stream of the mixture into at least two partial streams, comprising a) providing streams of the at least two fluids via separated conduits; b) combining the streams of the fluids and forming a homogeneous mixture; c) measuring the pressure in the conduit conveying the mixture of the fluids; d) splitting the stream of the mixture of the fluids into at least two partial streams and feeding each of the partial streams to a conduit equipped with a flow control device controlled by a controller; and e) adjusting the flow rates of the partial streams of the mixture of the fluids by feeding the pressure information measured in step c) as process variable to the controllers controlling the flow control devices, a process for feeding a mixture of at least two fluids via at least two feeding points, an apparatuses for carrying out such processes and a process for polymerizing olefins.

9 Claims, 1 Drawing Sheet

(52) U.S. Cl.
CPC .... *B01F 15/00253* (2013.01); *B01F 15/00344* (2013.01); *B01J 4/008* (2013.01); *C08F 10/00* (2013.01); *C08F 110/02* (2013.01)

(56) References Cited

U.S. PATENT DOCUMENTS

| | | | |
|---|---|---|---|
| 8,496,022 | B2 | 7/2013 | Sugiyama et al. |
| 2006/0074204 | A1* | 4/2006 | Isnard et al. ............ 526/72 |

| | | | |
|---|---|---|---|
| 2009/0145463 | A1 | 6/2009 | Oh et al. |

FOREIGN PATENT DOCUMENTS

| | | |
|---|---|---|
| EP | 0829491 A2 | 3/1998 |
| FR | 2872506 | 6/2006 |
| WO | WO 9704015 A1 | 2/1997 |
| WO | WO 0002929 A1 | 1/2000 |
| WO | WO 2009149159 A1 | 12/2009 |

* cited by examiner

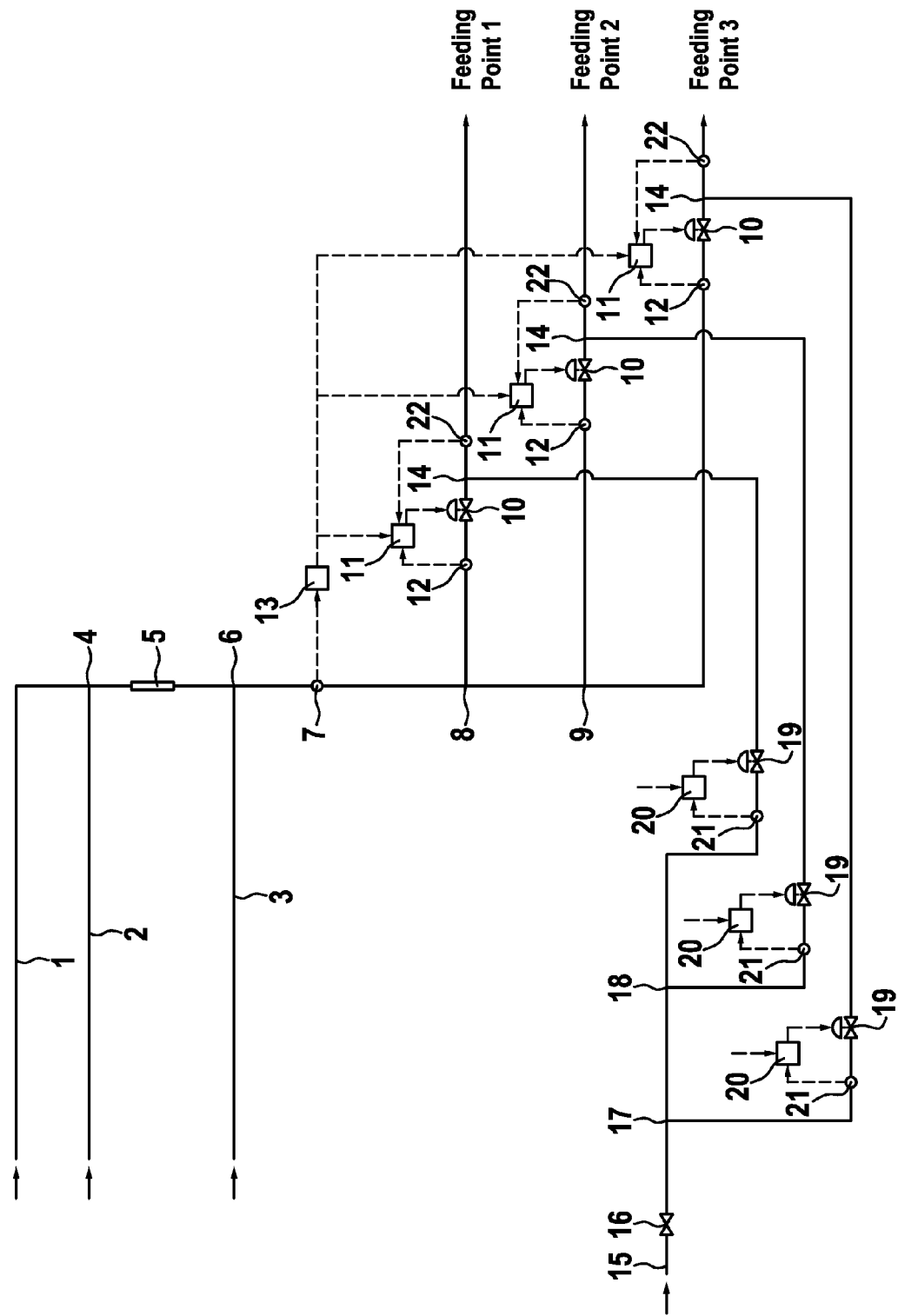

PROCESS AND APPARATUS FOR MIXING AND SPLITTING FLUID STREAMS

This application is the U.S. National Phase of PCT International Application PCT/EP2011/063266, filed Aug. 2, 2011, claiming priority of European Patent Application No. 10008047.2, filed Aug. 2, 2010 and the benefit under 35 U.S.C. 119(e) of U.S. Provisional Application No. 61/401,815, filed Aug. 19, 2010, the contents of which are incorporated herein by reference in their entirety.

The present invention relates to processes for continuously mixing at least two fluid streams and splitting the stream of the mixture into at least two partial streams, to processes for feeding a mixture of at least two fluids via at least two feeding points, to apparatuses for carrying out such processes and to processes for polymerizing olefins.

Certain chemical processes like, for example, a polymerization of olefins in a gas-phase fluidized-bed reactor require a very uniform distribution of all components of the reaction system throughout the reactor. Otherwise disturbances in the fluidized bed could arise such as build-up of electrostatic charges or occurrence of hot spot in the reactor bed which could, for example, cause lump formation or fouling in the reactor. However, if certain reactants or reaction auxiliaries need to be fed to the reactor local inhomogeneities are unavoidable. Accordingly, the homogenization of the feed streams into the system should be as fast as possible. Therefore it is common to feed such reactants or reaction auxiliaries via more than one feeding point while an as equal as possible distribution of the feeding streams to the feeding points is sought. EP 0 829 491 A2 describes for example the introducing of a deactivator into a fluidized-bed reactor through at least two deactivator introduction ports and WO 2009/149159 discloses feeding of a slurry catalyst composition to multiple injections points such that the flow is evenly distributed to each of the injection points.

If more than one reactant or reaction auxiliary shall be fed it is further common to add mixtures to the reactor to avoid a too high number of feeding points. Accordingly, it is a requirement to provide a method for mixing several reactants or reaction auxiliaries and splitting thereafter the mixture into several partial streams to feed them to the reactor, which method allows accurate adjustment of each flow of the components of the mixture and ensures an equal distribution of the feeding streams to the feeding points. This method should be as flexible as possible with respect to changing the components of the mixture or their ratio. It should further be as robust as possible if difficulties are encountered, for example occurrence of pressure fluctuations in the reactor or fouling in the feeding lines.

Thus, it was the object of the present invention to overcome the disadvantages of the prior art and to find a way for controlled mixing different fluid streams and splitting the stream of the mixture into partial streams that easily allows to maintain and adjust the ratio of the partial stream, even if difficulties are encountered like occurrence of pressure fluctuations in the reactor or partial or total plugging of feeding points.

We have found that this object is achieved by a process for continuously mixing at least two fluid streams and splitting the stream of the mixture into at least two partial streams, comprising a) providing streams of the at least two fluids via separated conduits;
b) combining the streams of the fluids and forming a homogeneous mixture;
c) measuring the pressure in the conduit conveying the mixture of the fluids;
d) splitting the stream of the mixture of the fluids into at least two partial streams and feeding each of the partial streams to a conduit equipped with a flow control device controlled by a controller; and
e) adjusting the flow rates of the partial streams of the mixture of the fluids by feeding the pressure information measured in step c) as process variable to the controllers controlling the flow control devices.

Furthermore, we have found processes for feeding a mixture of at least two fluids via at least two feeding points, apparatuses for carrying out such processes and processes for polymerizing olefins.

The features and advantages of the present invention can be better understood via the following description and the accompanying drawing which shows schematically the set-up for a preferred feeding system according to the process of the present invention.

The process of the present invention refers to a continuous mixing of different fluid streams. These streams are provided with defined flow rates. The number of streams to be mixed is in theory unlimited. In preferred embodiments of the invention the number of streams is from 2 to 10, preferably from 2 to 5 and in particular 2, 3 or 4. The fluid streams can be in liquid or gaseous state, while liquid streams can be formed from pure substances, solutions, emulsions or dispersions. The only prerequisite is that the material to be mixed with the other components is transportable. It is further also possible to mix liquid streams with gaseous streams. In a preferred embodiment of the present invention all fluid streams to be mixed are liquid streams.

It is further distinctive for the process of the present invention that the mixture of the fluids is split into at least two partial streams. The number of partial streams, in which the mixture of the fluids is split, is again in theory unlimited. In preferred embodiments of the invention the number of partial streams is from 2 to 10, preferably from 2 to 5 and in particular 2, 3 or 4.

The fluids to be mixed are individually provided as streams, i.e. via separated conduits. The amount of each fluid in the resulting mixture, i.e. the ratio of the components of the mixture, is determined by the amount of fluids delivered per time, i.e. by the flow rate of the fluids. Accordingly, the flow rate of the fluids to be mixed has to be controlled, for example by a mass flow meters or a volume flow meter. Preferably the fluids are provided with constant flow rates which are adjustable if the ratio of the components of the mixture shall be altered or components of the mixture shall be exchanged.

The mixing of the streams to form the homogeneous mixture can be carried out by just combining the streams of the fluids and conveying them in a common conduit. It is however also possible to use one or more devices for improving mixing such as static mixers. These mixing devises can be used to improve mixing of all or of only some of the streams.

The advantage of the present invention is especially that it is ensured that the ratio of the flow rates of each of the partial streams of the mixture of the fluids is kept constant. This is achieved by controlling individually the flow rates of the partial streams. For this purpose all conduits for conveying the partial streams of the mixture of the fluids are equipped with flow control devices, which are controlled by a controller. Preferably the flow control devices are control valves. Since the flow rates of the partial streams are individually controlled small deviation of the geometry of the conduits like different lengths or slightly different diameters do not interfere with the accurate adjustment of the flow rate. Furthermore, also slight deviations over time like build-ups of incrustations do not have an effect on the flow rate of the partial streams.

For steering the flow rates of the partial streams the pressure in the conduit conveying the mixture of the fluids is measured. Accordingly, this pressure measurement occurs downstream of the position where the fluid streams are combined or mixed or, if there are more than one positions where fluid streams are combined, downstream of the position where the last of the fluid streams is added, and upstream of the first separation of a partial stream. The measured pressure information is fed as process variable to the controllers controlling the flow control devices. That means, if the pressure in the conduit conveying the mixture of the fluids raises all flow control devices allow a higher flow rate of the partial streams. Vice versa, if the pressure in the conduit conveying the mixture of the fluids decreases all flow control devices reduce the flow rate of the partial streams. Accordingly, the total amount of the mixture to be prepared and fed can easily be increased by just increasing the over-all flow rate of fluids to be mixed and the ratio of the component can easily be amended by just changing the ratio of the flow rates of the fluids to be mixed. Steering the flow rates of the partial streams of the mixture of the fluids by the pressure in the conduit conveying the mixture of the fluids allows decoupling of the flow rates of the provided streams of the components of the mixture from the flow rates of the partial streams of the mixture of the fluids.

In a preferred embodiment of the present invention the ratios of the flow rates of the partial streams are not unchangeably implemented in the controllers controlling the flow control devices but are fed as setpoints to the controllers. That means, by amending these setpoints it is possible to intentionally vary these ratios. Preferably however the flow rates of all partial streams are identical. Thus, preferably the setpoints for the controllers controlling the flow control devices are chosen in a way, that the flow rates for all partial streams of the mixture of the fluids are the same.

According to a further preferred embodiment of the present invention a carrier fluid is continuously added to the conduits conveying the partial streams downstream of the flow control device. Such a carrier fluid can be liquid or gaseous and is preferably gaseous. The carrier fluid can assist in a fast distributing of the mixture of the fluids in a reaction system. It can further help in preventing the conduits from being plugged. Preferably the flow of the carrier fluid is controlled by additional flow control devices which are preferably control valves.

The mixing process of the present invention can advantageously be utilized in a process for feeding a mixture of different fluids via at least two feeding points. The fluids are then combined by such a mixing process and the partial streams of the mixture of the fluids are conveyed to the feeding points. The feeding can be effected to all kinds of objects such as vessels, pipes or conduits. In preferred embodiments of the present invention the mixture of the fluids is fed to a device for carrying out chemical reactions, preferably to a reactor for carrying out chemical reactions. These chemical reactions can be all kinds of chemical reactions and are preferably polymerization reactions, especially polymerizations reactions for preparing polyolefins.

Preferred polymerizations reactions for preparing polyolefins are polymerizations reactions for the polymerization of 1-olefins, i.e. hydrocarbons having terminal double bonds, without being restricted thereto. Suitable monomers can be functionalized olefinically unsaturated compounds such as ester or amide derivatives of acrylic or methacrylic acid, for example acrylates, methacrylates, or acrylonitrile. Preference is given to nonpolar olefinic compounds, including aryl-substituted 1-olefins. Particularly preferred 1-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and non-conjugated dienes such as 1,3-butadiene, 1,4-hexadiene or 1,7-octadiene or vinylaromatic compounds such as styrene or substituted styrene. It is also possible to polymerize mixtures of various 1-olefins. Suitable olefins also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is also possible to polymerize mixtures of two or more olefins. The reactions can be used in particular for the homopolymerization or copolymerization of ethylene or propylene. As comonomers in ethylene polymerization, preference is given to using up to 40 wt.-% of $C_3$-$C_8$-1-alkenes, in particular 1-butene, 1-pentene, 1-hexene and/or 1-octene. Preferred comonomers in propylene polymerization are up to 40 wt.-% of ethylene and/or butene. Particular preference is given to a process in which ethylene is copolymerized with up to 20 wt.-% of 1-hexene and/or 1-butene.

Suitable processes, in which the polymerizations reactions can be carried out, are solution processes, suspension processes, stirred gas-phase processes and gas-phase fluidized-bed processes. Processes of these types are generally known to those skilled in the art. Among the polymerization processes mentioned, gas-phase polymerization, in particular in gas-phase fluidized-bed reactors are preferred.

According to an especially preferred embodiment the present invention relates to a process for feeding a mixture of at least two fluids via at least two feeding points to a gas-phase reactor for preparing polyolefins. This gas-phase reactor for preparing polyolefins can be of any type commonly used for the purpose and is preferably a fluidized-bed reactor, i.e. a reactor comprising a bed of polymerizing polymer particles which are kept in fluidized state by introducing a gas from below. This gas is then usually taken off at the upper end of the reactor, cooled to remove the heat of polymerization and recirculated back into the reactor at its lower end. When such a process is employed for the polymerization of olefins, the circulated reactor gas is usually a mixture of the 1-olefins to be polymerized, inert gases such as nitrogen and/or lower alkanes such as ethane, propane, butane, pentane or hexane and optionally a molecular weight regulator such as hydrogen. The use of nitrogen or propane as inert gas, if appropriate in combination with further lower alkanes, is preferred. The polymerization can also be carried out in a condensed or supercondensed mode, in which part of the circulating gas is cooled to below the dew point and returned to the reactor separately as a liquid and a gas phase or together as a two-phase mixture in order to make additional use of the enthalpy of vaporization for cooling the reaction gas.

In gas-phase fluidized-bed reactors, it is advisable to work at pressures of from 0.1 to 10 MPa, preferably from 0.5 to 8 MPa and in particular from 1.0 to 3 MPa. The process is advantageously carried out at temperatures of from 30 to 160° C., particularly preferably from 65 to 125° C., with temperatures in the upper part of this range being preferred for copolymers of relatively high density and temperatures in the lower part of this range being preferred for copolymers of lower density.

It is also possible to use a multizone reactor in which two polymerization zones are linked to one another and the polymer is passed alternately a plurality of times through these two zones, with the two zones also being able to have different polymerization conditions. Such a reactor is described, for example, in WO 97/04015 and WO 00/02929.

The polymerization of olefins can be carried out using all customary olefin polymerization catalysts. That means the polymerization can be carried out using Phillips catalysts based on chromium oxide, using titanium-based Ziegler- or Ziegler-Natta-catalysts, or using single-site catalysts. For the purposes of the present invention, single-site catalysts are catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are often designated as hybrid catalysts. The preparation and use of these catalysts for olefin polymerization are generally known.

Preferred catalysts are catalysts of the Phillips type, which are preferably prepared by applying a chromium compound to an inorganic support and subsequently calcinating this at temperatures in the range from 350 to 950° C., resulting in chromium present in valences lower than six being converted into the hexavalent state. Apart from chromium, further elements such as magnesium, calcium, boron, aluminum, phosphorus, titanium, vanadium, zirconium or zinc can also be used. Particular preference is given to the use of titanium, zirconium or zinc. Combinations of the abovementioned elements are also possible. The catalyst precursor can be doped with fluoride prior to or during calcination. As supports for Phillips catalysts, which are also known to those skilled in the art, mention may be made of aluminum oxide, silicon dioxide (silica gel), titanium dioxide, zirconium dioxide or their mixed oxides or cogels, or aluminum phosphate. Further suitable support materials can be obtained by modifying the pore surface area, e.g. by means of compounds of the elements boron, aluminum, silicon or phosphorus. Preference is given to using a silica gel. Preference is given to spherical or granular silica gels, with the former also being able to be spray dried. The activated chromium catalysts can subsequently be prepolymerized or pre-reduced. The pre-reduction is usually carried out by means of cobalt or else by means of hydrogen at 250 to 500° C., preferably at 300 to 400° C., in an activator.

The process of the present invention can be used to mix and split all kinds of fluids. According to a preferred embodiment of the present invention the fluids are fed to a gas-phase polymerization reaction for preparing polyolefins and are selected from the group consisting of polymerization auxiliaries, fluid catalyst compositions and diluents. Suitable polymerization auxiliaries to be fed are for example antistatic agents, catalyst deactivating agents, modifiers for the polymerization behavior such as molecular weight regulators or comonomer incorporation modifiers, scavengers like metal alkyl compounds or cocatalysts. Further fluid components which can be admixed according to the present invention are fluid catalyst compositions such as catalyst solutions or catalyst slurries, whereof catalyst slurries are preferred. Furthermore, for example to improve the facility to meter these substances, it is also possible to further mix the other components of the mixture with inert diluents, for instance saturated hydrocarbons such as hexane.

According to a preferred embodiment of the process for feeding mixtures it is possible to change the preset ratio of the flow rates of the partial streams if a blockade in a conduit conveying a partial stream of the mixture of the fluids is detected. Preferably the preset ratio of the flow rates of the partial streams is then changed in a way that the flow through the blocked conduit is reduced or halted and an overproportional part of the mixture or the whole mixture of the fluids is fed via the remaining conduits for conveying partial streams of the mixture of the fluids. A blockade in a conduit conveying a partial stream could result for instance from deposits of components of the mixtures of the fluids or from build-up of polymer in the conduits. Such a blockade can be complete or partial. However, preferably the ratio of the flow rates of the partial streams is already changed before the conduit is completely blocked. A blockade in the conduits conveying the partial streams can for example be detected by measuring the pressure in the conduits downstream of the flow control devices since an increasing plugging of a conduit conveying a partial stream leads to a pressure increase upstream of the plugging. Since such a pressure increase can also be monitored in the conduits conveying the carrier fluid if such conduits are present, it is as well possible to detect blockades in the conduits conveying the partial streams of the mixture of the fluids by measuring the pressure in the conduits conveying the carrier fluid. Alternately, a blockade in the conduits conveying the partial streams can be detected by monitoring the controller output to the flow control devices or the status of the flow control devices because an increasing plugging of a conduit conveying a partial stream causes the controller of the flow control device to raise the output to the flow control device, that means to modify the flow control device in a way to allow higher flow rates such as, for example, increasing the opening of a control valve. Preferably the blocking of the conduits conveying the partial streams is monitored by measuring the pressure in these conduits downstream of the flow control devices.

FIG. 1 shows a scheme for a feasible set-up for feeding a mixture of three fluids via three feeding points according to the process of the present invention. Such a feeding can for example be a feeding to a fluidized-bed reactor for preparing polyolefins like polyethylene.

The set-up shown in FIG. 1 is used for mixing a stream of n-hexane as diluent provided by conduit (1), a stream of an antistatic agent solution provided by conduit (2) and a stream of a cocatalyst solution, preferably a solution of an aluminum alkyl such as triethylaluminum, provided by conduit (3). The streams of n-hexane and the antistatic agent solution are combined in junction (4) and further mixed in static mixer (5). The resulting mixture is then combined with the stream of the cocatalyst solution in junction (6).

The resulting mixture of the fluids passes a pressure measuring device (7) and is then split in three partial streams in bifurcations (8) and (9).

All three conduits for conveying the partial streams of the mixture of the fluids are equipped with flow control devices (10), which are controlled by controllers (11) based on the information of the respective flow rates measured in flow meters (12). Suitable flow meters are for instance mass flow meters. For adjusting the flow rates of the partial streams the pressure measured by pressure measuring device (7) is converted by controller (13) in data which are fed as process variables to controllers (11). The flow rates of the partial streams are further adjusted by controllers (11) based on data, which are fed as setpoints to controllers (11) for controlling the ratio of the flow rates of the partial streams. Preferably these setpoints are selected in a way that the flow rates of all partial streams of the mixture of the fluids are the same.

In a preferred set-up for feeding the mixture of fluids, a carrier fluid is added to the partial streams of the mixture downstream of flow control devices (10) in junctions (14). The carrier fluid is preferably a carrier gas and can be for example nitrogen, recycle gas or ethylene. The stream of carrier fluid is provided by conduit (15), passes valve (16) and is then split in three partial carrier fluid streams in bifurcations (17) and (18). The flow rates of the partial carrier fluid streams are adjusted by flow control devices (19), which are controlled by controllers (20) based on the information of the respective flow rates measured in flow meters (21). Suitable flow meters are for instance mass flow meters.

The conduits for conveying the partial streams of the mixtures of the fluids are in a preferred embodiment further equipped with pressure measuring devices (22) downstream of junctions (14). In an alternative embodiment, the pressure measuring devices (22) are located in the conduits for conveying the carrier fluid between flow control devices (19) and junctions (14). The pressure information measured by devices (22) is used to monitor blockades in the conduits for conveying the partial streams of the mixtures. In case the pressure measured by one of the pressure measuring devices (22) exceeding a certain value indicating a blockade in the respective conduit the respective controller (11) modifies the output to flow control devices (10) in a way, that the flow through the conduit, in which the blockade was detected, is halted or reduced. As a consequence of the reduced flow through one the flow control devices (10) the pressure at pressure measuring device (7) will raise and controller (13) will increase the output fed as process variables to controllers (11) so that the flow rates of the partial streams in the non-blocked conduits are equally increased. If the blockade is total the whole mixture of fluids is fed via the remaining two conduits, preferably still in the equal amounts. In an alternative embodiment, data measured by pressure measuring devices (22) are fed to controller (13) and controller (13) modifies the process variables fed to controllers (11) in a way that a reduced flow through the conduit, in which the blockade was detected, is obtained.

The set-up allows a very accurate split of the mixture of fluids in partial streams with the same flow rate. These partial streams can in principle be fed to a reactor for polymerizing olefin at all positions. For fluidized-bed reactors the feeding points are preferably located at the same height of the reactor, preferably in equal distances from each other. In a preferred embodiment the partial streams of the mixture of the fluids are introduced into the reactor via lances which extend into the reactor. That means, the feeding points are within the reactor and in a certain distance from the reactor wall.

The present invention further refers to an apparatus for mixing at least two fluid streams and splitting the stream of the mixture into at least two partial streams, comprising
a) at least two conduits for providing fluids to be mixed;
b) at least one junction for the conduits providing the fluids;
c) a pressure measuring device at the conduit conveying the mixture downstream of the junction or, if there are more than one junction, downstream of the last of the junctions;
d) at least one furcation into at least two conduits equipped with a flow control device controlled by a controller; and
e) data transmission lines for feeding the pressure information measured by the pressure measuring device c) to the controllers controlling the flow control devices.

In a preferred embodiment the apparatus further comprises conduits for providing a carrier fluid connected to the conduits for conveying the partial streams downstream of the flow control devices, wherein the conduits for conveying the carrier fluid are preferably equipped with flow control devices.

Such apparatuses can advantageously be used as a device for feeding mixtures of fluids to an apparatus for polymerizing olefins further comprising at least one polymerization reactor, at least one monomer feeding device and at least one product off-take device. Accordingly, the present invention also refers to processes for polymerizing olefins comprising feeding at least one olefin and at least one polymerization catalyst to such an apparatus, polymerizing the olefins in the presence of the polymerization catalyst and withdrawing the obtained polyolefin from the apparatus.

The invention claimed is:

1. A process for continuously mixing at least two fluid streams and splitting the stream of the mixture into at least two partial streams, comprising
a) providing streams of the at least two fluids via separated conduits;
b) combining the streams of the fluids and forming a homogeneous mixture;
c) measuring the pressure in the conduit conveying the mixture of the fluids;
d) splitting the stream of the mixture of the fluids into at least two partial streams and feeding each of the partial streams to a conduit equipped with a flow control device controlled by a controller; and
e) adjusting the flow rates of the partial streams of the mixture of the fluids by feeding the pressure information measured in step c) as process variable to the controllers controlling the flow control devices
wherein a carrier fluid is continuously fed to the conduits conveying the partial streams downstream of the flow control device.

2. The process according to claim 1, wherein data for obtaining a preset ratio of the flow rates of the partial streams are fed as setpoints to the controllers controlling the flow control devices.

3. The process according to claim 1, wherein the setpoints for the controllers controlling the flow control devices are chosen in a way, that the flow rates for all partial streams are the same.

4. The process according to claim 1, wherein the flow of the carrier fluid is controlled by flow control devices.

5. The process according to claim 1, wherein the process includes the step of conveying the partial streams of the mixture to at least two feeding points.

6. The process according to claim 5, wherein the mixture of the fluids is fed to a device for carrying out chemical reactions.

7. The process according to claim 6, wherein the device for carrying out chemical reactions is a gas-phase reactor for preparing polyolefins.

8. The process according to claim 7, wherein the fluids are selected from the group consisting of polymerization auxiliaries, fluid catalyst compositions and diluents.

9. The process according to claim 5, wherein, after detecting a blockade in a conduit conveying a partial stream of the mixture of the fluids, the preset ratio of the flow rates of the partial streams is changed in a way, that the flow through the blocked conduit is halted and the whole mixture of the fluids is fed via the remaining conduits for conveying partial streams of the mixture of the fluids.

* * * * *